(12) United States Patent
Robles Gil Daellenbach et al.

(10) Patent No.: US 10,552,811 B2
(45) Date of Patent: Feb. 4, 2020

(54) CASH MACHINE SECURITY SYSTEMS AND METHODS

(71) Applicant: MICROSAFE SA DE CV, Tlanepantla (MX)

(72) Inventors: Francisco Robles Gil Daellenbach, Tecamachalco Edo (MX); Pablo Robles Gil Martinez Del Rio, Tecamachalco Edo (MX)

(73) Assignee: MICROSAFE SA DE CV, Tlanepantla (MX)

( * ) Notice: Subject to any disclaimer, the term of this patent is extended or adjusted under 35 U.S.C. 154(b) by 519 days.

(21) Appl. No.: 15/174,256

(22) Filed: Jun. 6, 2016

(65) Prior Publication Data

US 2017/0004466 A1 Jan. 5, 2017

Related U.S. Application Data

(60) Provisional application No. 62/171,511, filed on Jun. 5, 2015, provisional application No. 62/171,519, filed on Jun. 5, 2015.

(51) Int. Cl.
*G07F 19/00* (2006.01)
*G06Q 20/10* (2012.01)
*G07D 11/00* (2019.01)

(52) U.S. Cl.
CPC ..... *G06Q 20/1085* (2013.01); *G07D 11/0093* (2013.01); *G07F 19/201* (2013.01); *G07F 19/203* (2013.01); *G07F 19/209* (2013.01); *G07F 19/2055* (2013.01)

(58) Field of Classification Search
CPC ............ G06Q 20/1085; G07D 11/0093; G07F 19/201; G07F 19/203; G07F 19/2055; G07F 19/209

USPC ........................................................ 253/379
See application file for complete search history.

(56) References Cited

U.S. PATENT DOCUMENTS

| | | | |
|---|---|---|---|
| 3,653,480 | A | 4/1972 | Yamamoto et al. |
| 3,826,344 | A | 7/1974 | Wahlberg |
| 4,359,631 | A | 11/1982 | Lockwood et al. |
| 4,502,120 | A | 2/1985 | Ohnishi |
| 4,537,547 | A | 8/1985 | Cole |
| 4,669,596 | A | 6/1987 | Capers et al. |
| 4,877,950 | A | 10/1989 | Halpern |

(Continued)

FOREIGN PATENT DOCUMENTS

| | | |
|---|---|---|
| EP | 1 515 496 | 3/2005 |
| GB | 2186412 | 8/1987 |
| GB | 2435538 | 8/2007 |

OTHER PUBLICATIONS

Office Action issued in MX/a/2016/007383 dated Feb. 26, 2019.

(Continued)

*Primary Examiner* — Karl D Frech
(74) *Attorney, Agent, or Firm* — DLA Piper LLP (US)

(57) ABSTRACT

Systems and methods described herein may provide automated teller machine (ATM) security. For example, an ATM security system may comprise an ink staining system, an electronic lock, and a processor in communication with the electronic lock and the ink staining system. The processor may be configured to determine that the lock is being opened, disable the ink staining system in response to the determining, and enable the ink staining system when the lock has been closed.

19 Claims, 13 Drawing Sheets

(56) References Cited

U.S. PATENT DOCUMENTS

| | | |
|---|---|---|
| 5,450,938 A | 9/1995 | Rademacher |
| 5,615,625 A | 4/1997 | Cassidy et al. |
| 5,641,050 A | 6/1997 | Smith et al. |
| 5,822,216 A | 10/1998 | Satchell, Jr. et al. |
| 5,844,808 A | 12/1998 | Konsmo |
| 5,870,698 A | 2/1999 | Riedel |
| 5,930,771 A | 7/1999 | Stapp |
| 6,250,452 B1 | 6/2001 | Partyka et al. |
| 6,390,269 B1 | 5/2002 | Billington et al. |
| 6,450,400 B1 | 9/2002 | Savoir, Jr. |
| 6,553,922 B1 | 4/2003 | Lundblad et al. |
| 6,564,726 B1 | 5/2003 | Lindskog |
| 7,856,401 B2 * | 12/2010 | Ross .................. G06K 7/0008 235/379 |
| 7,925,791 B2 | 4/2011 | Ellis |
| 8,098,485 B2 | 1/2012 | Weaver |
| 8,595,312 B2 | 11/2013 | Daellenbach et al. |
| 8,939,358 B2 | 1/2015 | Cardinal et al. |
| 9,117,323 B2 | 8/2015 | Brexel et al. |
| 9,422,761 B2 | 8/2016 | Berendes |
| 2003/0168508 A1 | 9/2003 | Daellenbach et al. |
| 2006/0054614 A1 | 3/2006 | Baxter et al. |
| 2006/0106490 A1 | 5/2006 | Howell et al. |
| 2009/0108015 A1 | 4/2009 | Kreamer |
| 2010/0028501 A1 | 2/2010 | Baster et al. |
| 2010/0194569 A1 | 8/2010 | Lindskog |
| 2011/0035574 A1 | 2/2011 | Jevans et al. |
| 2014/0115211 A1 | 4/2014 | Daellenbach et al. |
| 2016/0376828 A1 | 12/2016 | Grant et al. |

OTHER PUBLICATIONS

English language translation of Office Action issued in MX/a/2016/007383 dated Feb. 26, 2019.

International Search Report issued in International Application No. PCT/IB2011/002126, dated Dec. 30, 2011.

Written Opinion issued in International Application No. PCT/162011/002126, dated Dec. 30, 2011.

International Preliminary Examination Report on Patentability issued Jan. 17, 2013.

Corrigan, Steve, Controller Area Network Physical Layer Requirements, pp. 1-11 (Jan. 2008).

Office Action issued in MX/a/2013/000264 dated Feb. 16, 2015.

English language translation of Office Action issued inMX/a/2013/000264 dated Feb. 16, 2015.

Image File Wrapper of US Application U.S. Appl. No. 14/057,223 filed Oct. 18, 2013 downloaded from PAIR on Sep. 16, 2019.

Image File Wrapper of US Application U.S. Appl. No. 13/174,353 filed Jun. 30, 2011 downloaded from PAIR on Sep. 16, 2019.

Image File Wrapper of US Application U.S. Appl. No. 15/174,261 filed Jun. 6, 2016 downloaded from PAIR on Sep. 16, 2019.

U.S. Appl. No. 14/057,223, U.S. Pub. No. 2014-0115211, dated Apr. 24, 2014, Patent No. 9,928,189.

U.S. Appl. No. 13/174,353, U.S. Pub. No. 2012-0005297 dated Jan. 5, 2012, Patent No. 8,595,312.

U.S. Appl. No. 15/174,261, U.S. Pub. No. 2017-0004668, dated Jan. 5, 2017.

* cited by examiner

CASH MACHINE SECURITY SYSTEMS AND METHODS

CROSS-REFERENCE TO RELATED APPLICATIONS

This application claims the benefit of U.S. Provisional Application Nos. 62/171,511 filed Jun. 5, 2015 and 62/171,519 filed Jun. 5, 2015. All of the foregoing are incorporated by reference in their entireties.

This application is related to U.S. patent application Ser. No. 14/057,223 filed Oct. 18, 2013, which is a continuation of U.S. patent application Ser. No. 13/174,353 filed Jun. 30, 2011, which claims the benefit of U.S. Provisional Application No. 61/360,091 filed Jun. 30, 2010. All of the foregoing are incorporated by reference in their entireties.

This application is related to new US Patent Application filed on Jun. 6, 2016, entitled "Cash Container", which claims the benefit of U.S. Provisional Application Nos. 62/171,511 filed Jun. 5, 2015 and 62/171,519 filed Jun. 5, 2015. All of the foregoing are incorporated by reference in their entireties.

DETAILED DESCRIPTION OF SEVERAL EMBODIMENTS

Figure 1:
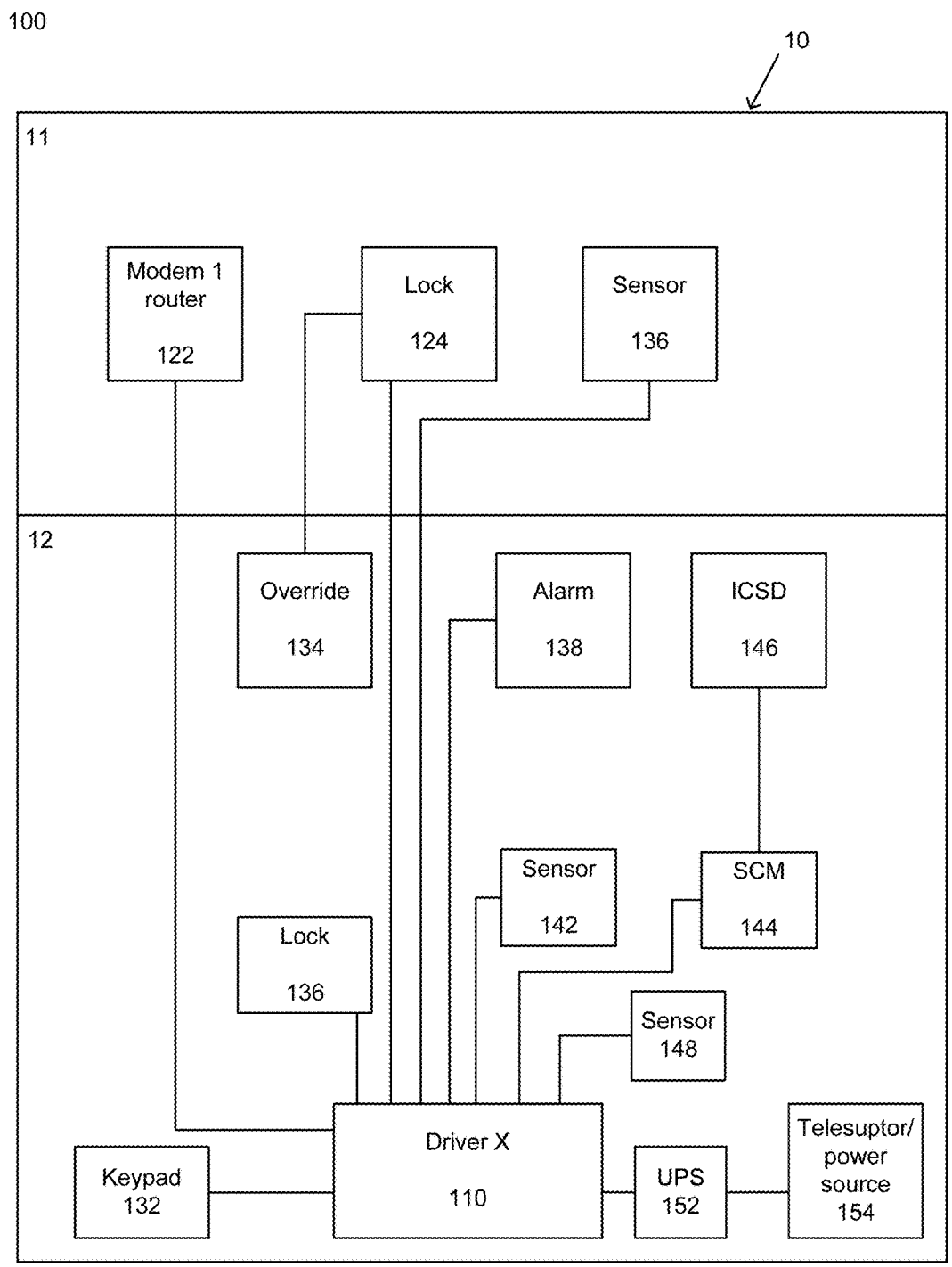
FIG. 1 is an ATM Intelligent Monitoring System according to an embodiment of the invention.

Cash machines, which may be called money depositing machines, automated teller machines (ATMs), or automated banking machines (ABMs), may be equipped with computer controls and security systems. The security systems may include locks and ink staining systems (e.g., the intelligent cash protection systems supplied by Oberthur Cash Protection). Authorized personnel may have a combination or key to unlock the lock and may be trained to add cash to and/or remove cash from the machines without triggering the ink staining systems. However, in some cases these personnel may trigger the ink staining systems inappropriately, for example accidentally or as part of an attempt to steal from the cash machine in the future by discouraging activation of the ink staining systems in the future. Systems and methods described herein may provide an ATM Intelligent Monitoring System (AIMS) which may deactivate the ink staining system when an authorized user begins to access the lock to prevent unwanted triggering of the ink staining system.

The AIMS may provide other security features as well. Some ATMs may have a non-secure compartment in addition to the secure compartment in which money is held. The non-secure compartment may provide access to some electrical components of the ATM, such as a serial data cable connected to a bill dispenser in the secure compartment. An unauthorized person may be able to open the non-secure compartment and connect a computer to the cable. Using the computer, the user may be able to reset the ATM encryption codes and command the bill dispenser to dispense money. ATMs may be able to dispense 30 bills at a time in some cases, and an unauthorized user may repeat dispense commands until all bills in the machine are dispensed. To prevent this, the AIMS may include a sensor, such as a magnetic sensor, on a main motor the dispenser inside the ATM. A controller may count how many times the motor rotates and know when it is dispensing money. The controller may control timings and/or cut off current to the dispenser, as described in greater detail below, to prevent unauthorized users from committing this kind of fraud.

The systems and methods described herein may comprise one or more computers. A computer may be any programmable machine capable of performing arithmetic and/or logical operations. In some embodiments, computers may comprise processors, memories, data storage devices, and/or other commonly known or novel circuits and/or components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, communication devices, and other terms. Computers may facilitate communications between users, may provide databases, may perform analysis and/or transformation of data, and/or perform other functions. It will be understood by those of ordinary skill that those terms used herein are interchangeable, and any computer capable of performing the described functions may be used.

FIG. 1 is an AIMS 100 according to an embodiment of the invention. The AIMS 100 may be housed within an ATM 10 which has a non-secure area 11 and a secure area 12. In some embodiments, the non-secure area 11 may be accessible by a user without third party intervention, for example through the use of a lock 124, which may be an electric lock. In other embodiments, the non-secure area 11 may not require any lock or other security. The secure area 12 may require more security than the non-secure area. For example, a user may be required to not only use a lock 136, but also enter a code via a keypad 132. The lock 136 may be an electronic lock, and the keypad 132 may also include a display configured to display entered symbols and/or error codes and other messages. Access codes for the keypad 132 may be provided by a remote central hub. A user may call the hub and receive an access code, as described in greater detail below.

Examples of elements that may be found in the non-secure area 11 and the secure area 12 are set forth below. It should be noted, however, that in some embodiments, any of these items may be in either the secure area 11 or the non-secure area 12, or both.

Figure 8:
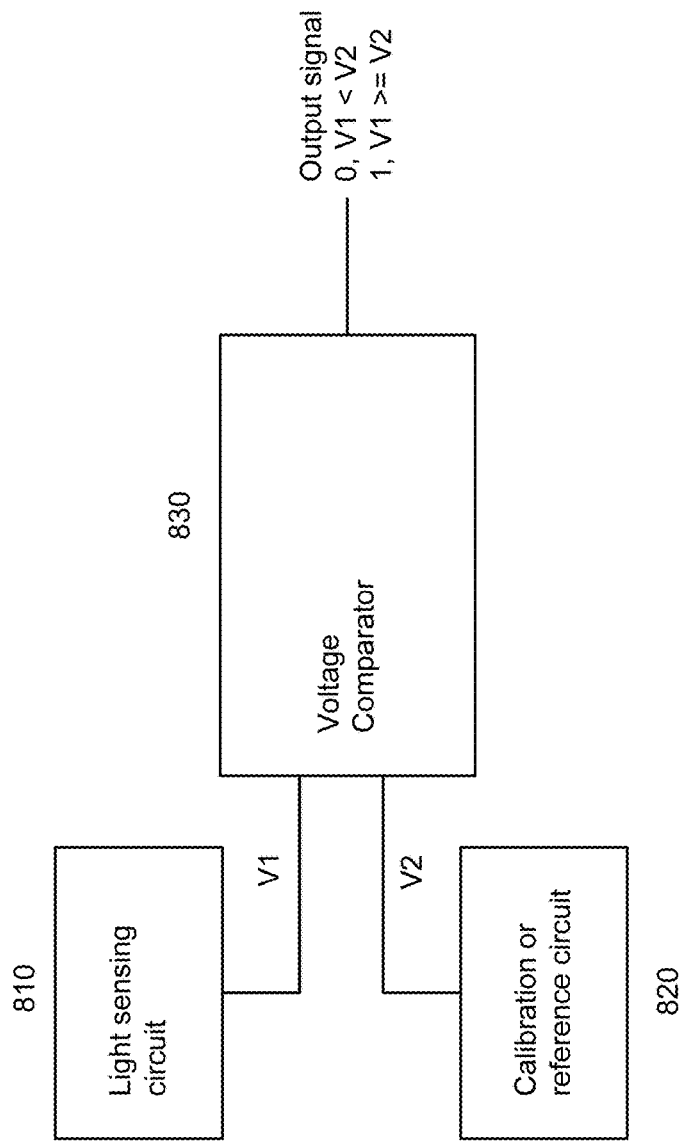
FIG. 8 is a sensor according to an embodiment of the invention.

In an embodiment, the non-secure area 11 may house a modem/router 122, the lock 124, and a sensor 126. For example, a lock such as the Southco R4-EM-21-161 may be used as the lock 124. The sensor 126 may include any sensor that can detect opening of the non-secure area, such as a light sensor that detects light from outside the ATM 10 when a door to the non-secure area 11 is open. FIG. 8 is an example light sensor 126 according to an embodiment of the invention. The sensor 126 may include a light sensing circuit 810 configured and arranged to detect light in the non-secure area 11 and output a voltage V1 corresponding to a detected light level, a calibration/reference circuit 820 configured to output a voltage V2, and a voltage comparator 830. The comparator 830 may be coupled to the light sensing circuit 810 and calibration/reference circuit 820 such that it may compare V1 from the light sensing circuit 810 with V2 from the calibration/reference circuit. The comparator 830 may output a logic 0 when V1 is less than V2 and a logic 1 when V1 is greater than or equal to V2. (In other embodiments, the comparator 830 may provide different outputs, e.g. a logic 1 when V1 is less than V2 and a logic 0 when V1 is greater than or equal to V2; in any case the comparator 830 may indicate which signal is greater.) V2 may be set according to a threshold indicating that light from outside the ATM 10 is in the non-secure area 11. For example, V1 may be configured to output a V1 proportional to an amount of light detected, and V2 may be set so that when the door to the non-secure area 11 is open, V1 is greater than or equal to V2. (In some embodiments, the light sensing circuit 810 may be configured to output a V1 inversely proportional to an amount of light detected, and V2 may be set so that when the door to the non-secure area 11 is open, V1 is less than or equal to V2). Therefore, the output of the comparator 830 may indicate that the door is open. The calibration/reference circuit 820 may have an adjustable output (e.g., adjustable via a potentiometer) so that V2 can be set according to a desired light level. For example, V2 may be adjusted to correspond to a light level in a room where the ATM 10 is located.

In some embodiments, the sensor 126 may include an inductive sensor configured and arranged to detect the presence of a metallic door to the non-secure area and emit a signal indicating whether the door is present (e.g., closed) within the sensor's magnetic field or not (e.g., open). For example, an OMRON E2A-S08KNO4-WP-C1 2M may be used as the inductive sensor 126. As those of ordinary skill in the art will appreciate, other sensors may be used to detect whether the non-secure area 11 has been accessed from the outside.

The secure area 12 may house the keypad/display 132, the lock 136, an override 134 in communication with the lock 136, an alarm (e.g., a buzzer such as a MG electronics KPS3610 Piezo Buzzer) 138, a sensor (e.g., a light sensor similar to that in the non-secure area 11) 142, a security control module (SCM) 144 and an in-cassette staining device (ICSD) 146, an inductive sensor 148 (e.g., a sensor such as the OMRON E2A-S08KN04-WP-C1 2M discussed above) or other lock sensor, a battery uninterruptible power supply (UPS) 152 and teleruptor/power source 154, and a central computer ("driver X" herein) 110 in communication with the AIMS 100 components as shown. The driver X 110 may be any suitable computer, for example a computer comprising an 8082 family processor. The lock 136 may be a supplied by a transit company that accesses the cash in the secure area (e.g., a La GARD Programmable Multi-User, Multi-Compartment Safe Lock) in some embodiments. In some embodiments, the override 134 may be a mechanical (or other) override that is a component of the lock 136, e.g. for use in case of power failure to the lock 136. The SCM 144 and ICSD 146 may be components of an ink staining system, such as the Oberthur Cash Protection system noted above. In some embodiments, the keypad/display 132 may be housed in an intermediate compartment that exists between a fake door and a door to the secure area 12. Thus, a user may not need to access the secure area 12 to interact with the keypad/display 132. The override 134 may sit inside the secure area 12 and provide a user with a last resort to access the non-secure area 11 in case of AIMS 100 failure. Without the override 134, in case of AIMS 100 failure, the non-secure area 11 door secured by the electronic lock 136 would have to be forced open, possibly damaging its mechanism.

Various embodiments for the driver X 110 may be possible, but in one example it may be in communication with a master computer (not shown) comprising intelligent vending controller (IVC) software. Driver X 110 may be configured to report events to the master computer, such as opening/closing/non-opening of the non-secure area 11 or secure area 12, alarm 138 activation, etc.

Generally, the non-secure area 11 and secure area 12 may be protected by the electronic locks 124/136 and, in some embodiments, additional locks. Furthermore, the secure area 12 may be hardened against forced entry. The electronic locks 124/136 may be randomic locks (e.g., the La GARD lock discussed above or other locks supplied by transit companies) or other locks (e.g., combination locks, key locks, the Southco lock discussed above, etc.). In some embodiments, a randomic lock (e.g., the La GARD) may be used as the lock 136 for the secure area 12, and a different lock (e.g., the Southco lock) may be used as the lock 124 for the non-secure area 11. In some embodiments, the one or more randomic locks may be the only lock or locks on the ATM used for access by authorized users, which may allow authorized users to service the ATM without keys. To open the electronic locks 124/136, a user may open an outer panel (i.e., the fake door) and access the keypad 132. The user may call a central hub and receive a code for the keypad 132, which may allow one or more of the locks (e.g., the lock 124 to the non-secure area 11) to be opened. However, unauthorized users may attempt to enter both the non-secure area 11 and the secure area 12 by force. The AIMS 100 may protect both the non-secure area 11 and the secure area 12 with several security features.

Figure 2:
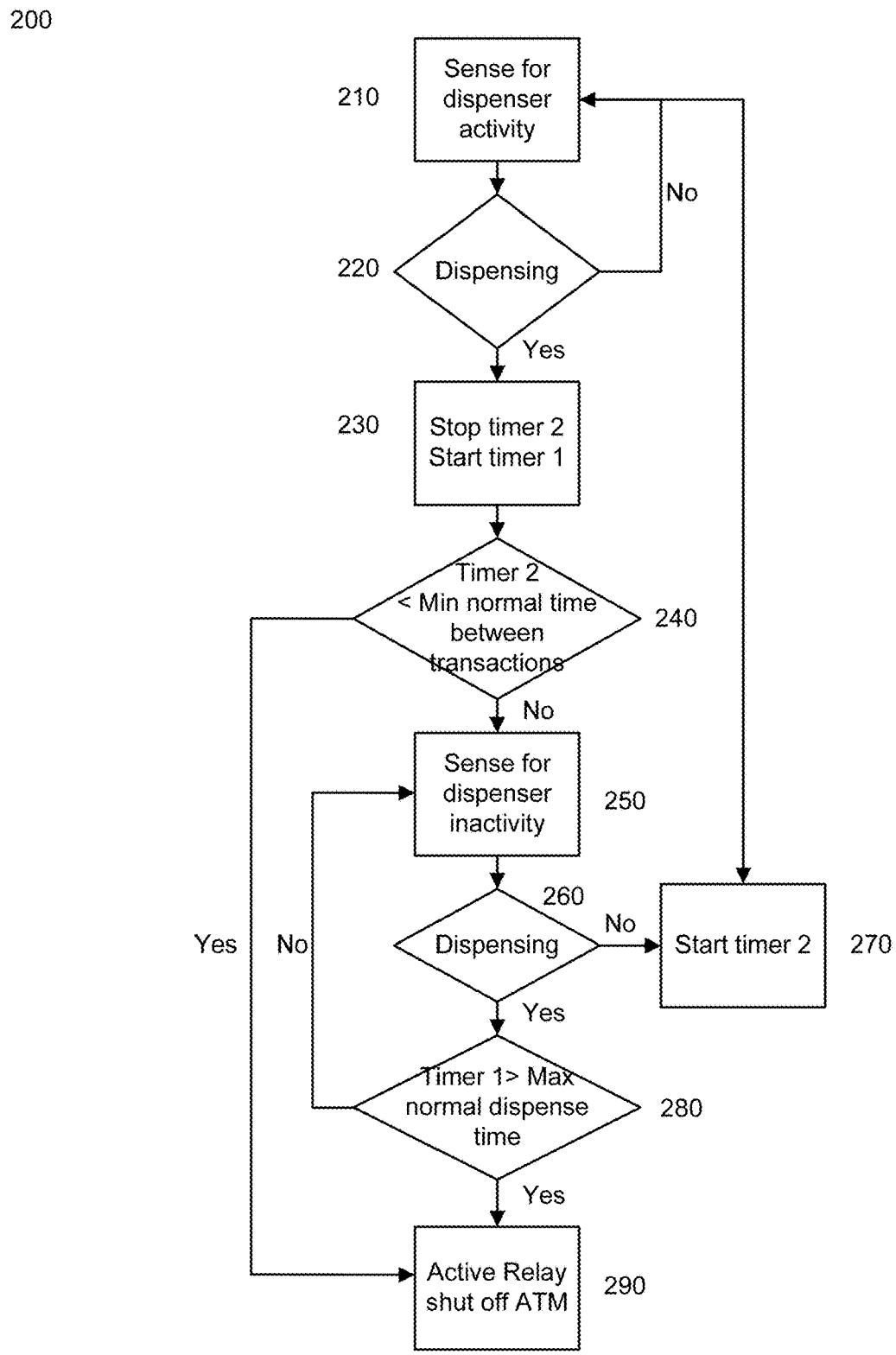
FIG. 2 is a cash dispenser control process according to an embodiment of the invention.

The non-secure area 11 may include one or more data cables (not shown), for example a serial data cable connected to a bill dispenser. The bill dispenser and cash may be housed in the secure area 12, but the cable may be in the non-secure area 11. FIG. 2 is a cash dispenser control process 200 according to an embodiment of the invention. This process 200 may allow the driver X 110 to monitor the sensor 142 and control bill dispenser timings to prevent fraud. The driver X 110 may detect time between dispenses. Considering that under a normal operation of the ATM there may be a minimum time required for a client to sign in, the driver X 110 may detect bill dispense commands that occur in less than this minimum time to detect fraud. For example, an unauthorized person may use a special device (e.g., a cell phone that interacts with an infected ATM computer that causes the ATM to automatically dispense money) to sign in, this device may sign in faster than a person would be able to sign in using their hands and a keypad. The driver X 110 may also detect a time that the motor is rotating (e.g., indicating that the ATM is dispensing money and how much is it dispensing). For example, the driver X 110 may determine that the timer has exceeded a predefined maximum time. The time may be selected corresponding to a bank's maximum allowed amount (e.g., the driver X 110 may be configurable to set a maximum time that corresponds to the time it takes to dispense a maximum number of bills that the bank has determined the ATM may dispense). Normal dispenses may be short since withdrawals of 30 plus bills from an ATM may be uncommon, and banks may have maximum withdrawal amounts associated with an account. According to the method 200 described below, the driver X 110 may notice that something is not normal because an operation exceeds the time allowed by the timer. In response, the driver X 110 may proceed to operate a relay that is installed at the power inlet of the ATM in the inner secure area, thus turning off the ATM and frustrating the burglar attack until the bank reacts. This system can be monitored or non-monitored.

In 210, the driver X 110 may sense for dispenser activity by monitoring the sensor 142. In the example below, the sensor 142 used is a magnetic inductive sensor, but in other embodiments, any sensor may be used. For example, a magnetic inductive sensor 142 may be coupled to or disposed near the bill dispenser so that it can detect the motion of the bill dispenser when it is dispensing bills. The magnetic inductive sensor 142 may thus be activated when bills are being dispensed and send a signal to the driver X 110. In 220, if dispensing is not detected, the driver X 110 may continue sensing via the magnetic inductive sensor 142. If dispensing is detected, in 230 the driver X 110 may stop timer 2 and start timer 1. Timer 2 may be used to determine if time between dispenses or transactions is long enough because, as noted above, an illicit ATM access may happen faster than a human can interact with the ATM. Thus, timer 2 may be used to detect two or more consecutive dispenses in a shorter time period than that for which timer 2 is configured. This detection may indicate that current ATM operation is not a normal operation. Timer 1 may be used to determine whether a maximum withdrawal amount has been exceeded because a withdrawal operation has taken longer than a time associated with a maximum allowable withdrawal, as noted above. In 240, the driver X 110 may determine whether timer 2 has a value less than a minimum normal time between transactions. If not, in 250 the driver X 110 may sense for dispenser inactivity via the magnetic inductive sensor 142. In 260, if dispensing is not detected, the driver X 110 may proceed to 270 and start timer 2. After timer 2 is started, the driver X 110 may restart sensing for dispenser activity via the magnetic inductive sensor 142 in 210. If dispensing is detected, in 280 the driver X 110 may determine whether timer 1 has a value greater than a maximum normal dispense time. If not, the driver X 110 may continue sensing for dispenser inactivity via the magnetic inductive sensor 142. If so, in 290 the driver X 110 may activate a relay to shut off the dispenser. Also, if the timer 2 has a value less than a minimum normal time between transactions in 240, the driver X 110 may activate the relay to shut off the dispenser in 290. The relay may be part of the teleruptor/power source 154. The teleruptor/power source 154 may be the part of the ATM 10 that connects to the power outlet where the ATM 10 is installed. The teleruptor/power source 154 may be configured so that activating the relay shuts off the dispenser, but does not cut power to the ATM 10 generally. Thus, the security features of the ATM 10 may continue to operate, but the dispenser may be unable to dispense money. The driver X 110 may also generate an alert when the dispenser is deactivated. For example, the alert may be a local alarm and/or may be sent to a remote location. The sampling of dispenser activity may be performed at a very high frequency; so the time the sampling algorithm needs to execute a full iteration may be many orders of magnitude smaller than the dispenser activity times. Hence it may be unlikely that a dispense activity between 230 and 260 could "cheat" the algorithm.

Figure 3:
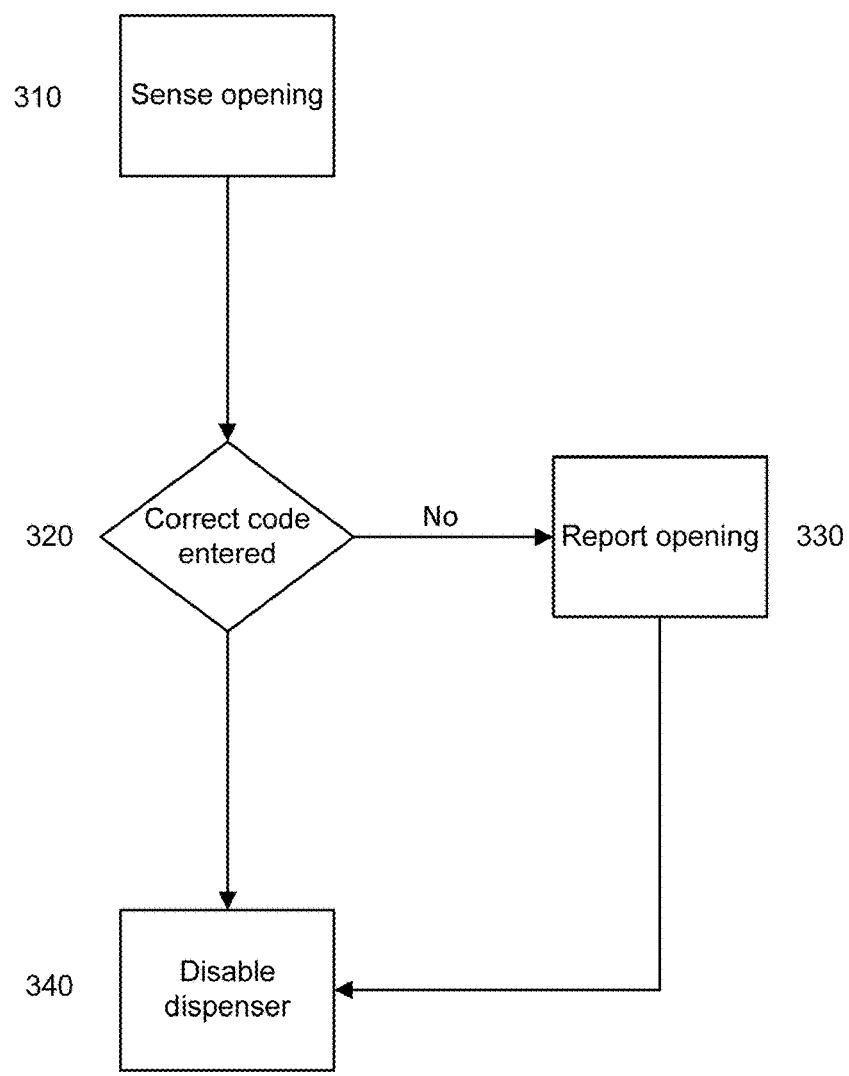
FIG. 3 is a cash dispenser disabling process according to an embodiment of the invention.

The AIMS 100 may employ other processes to protect the ATM 10 in addition and/or alternative to the cash dispenser control process 200. FIG. 3 is a cash dispenser disabling process 300 according to an embodiment of the invention. If the non-secure area 11 is opened, either after correct code entry to the keypad 132 or otherwise, the light sensor 136 may detect a change in light level in the non-secure area 11, for example due to light from the surrounding area entering the non-secure area 11. In 310, the driver X 110 may receive notice of the change in light from the light sensor 136. In 320, the driver X 110 may determine whether the entry was authorized (e.g., the correct code was entered) or unauthorized. If the entry was unauthorized, in 330 the driver X 110 may report the unauthorized entry. For example, the driver X 110 may send an alert to a remote hub via the modem/router 122. Also, the driver X 110 may cause the alarm 138 to sound in some embodiments. In 340, the driver X 110 may disable the dispenser. For example, the telereptor/power source 154 relay may be activated as described above with respect to FIG. 2. Thus, unauthorized users connecting to the serial data cable in the non-secure area 11 may be unable to command the dispenser to dispense cash.

The AIMS 100 may also include features to protect the secure area 12. In some cases, authorized users may trigger the ink staining systems of an ATM 10. This may be done unintentionally as a result of rough handling or intentionally. For example, a user may intentionally trigger ink staining to discourage banks from installing ATMs 10 with ink staining systems, so that ATMs 10 without ink staining systems can be more easily burglarized at a later time. To prevent improper ink staining, the lock 136 of the secure area 12 and the driver X 110 may be configured to assist the user in disabling the ink staining mechanism during authorized ATM 10 access.

Figure 10:
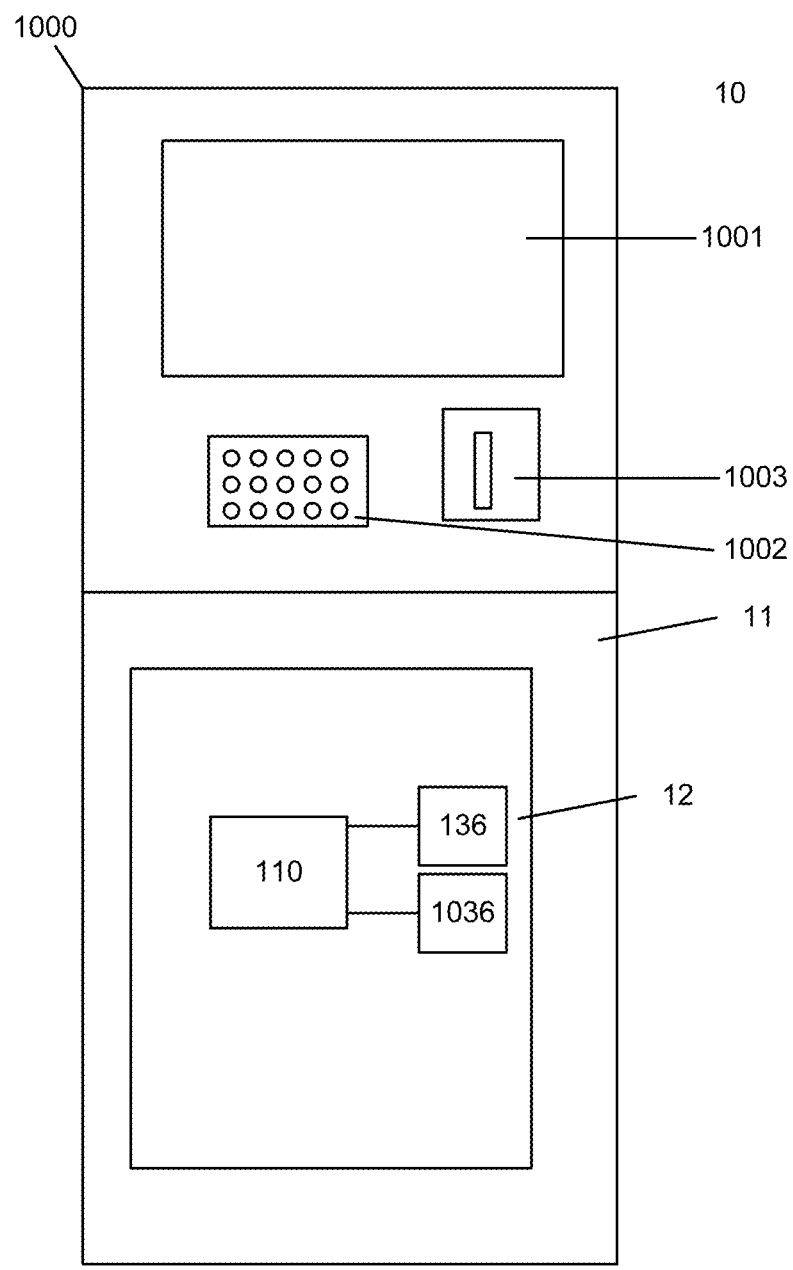
FIG. 10 is an ATM according to an embodiment of the invention.

FIG. 10 is an ATM 10 according to an embodiment of the invention. The ATM 10 may include a housing 1000, screen 1001, keypad 1002, card reader 1003, and/or other features. As discussed above, the ATM 10 may include a non-secure area 11 and secure area 12. The ATM 10 may house the driver X 110, secure area lock 136, an ink staining lock 1036, and/or other components of the AIMS 100 (not shown). The ink staining lock 1036 may be a lock disposed in the secure area 12, for example in addition to the lock 136, which may be used to control opening of the door to the secure area 12 in order to avoid triggering of the ink staining system.

Figure 4A:
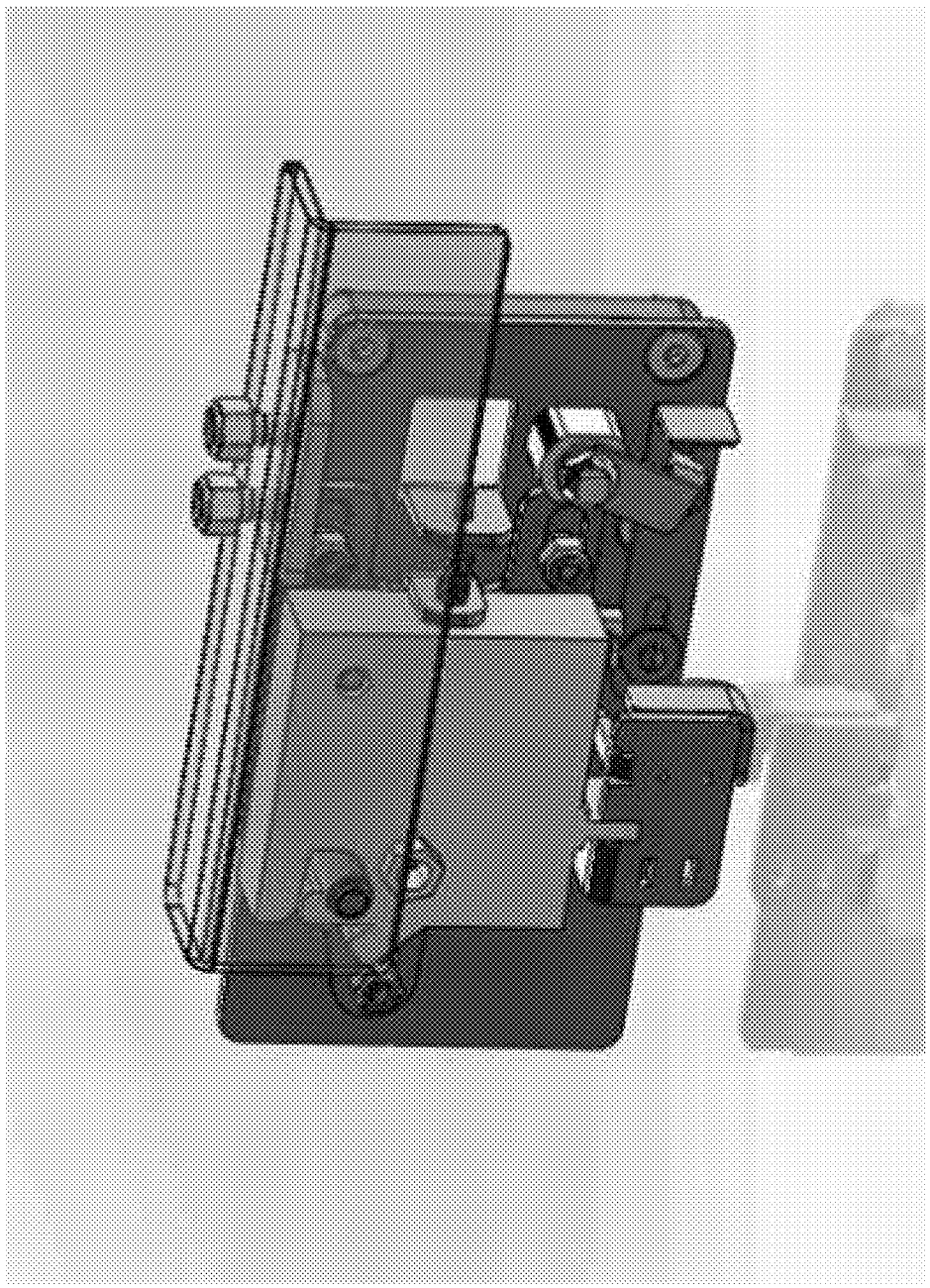
FIG. 4A is a perspective view of a lock according to an embodiment of the invention.
Figure 4B:
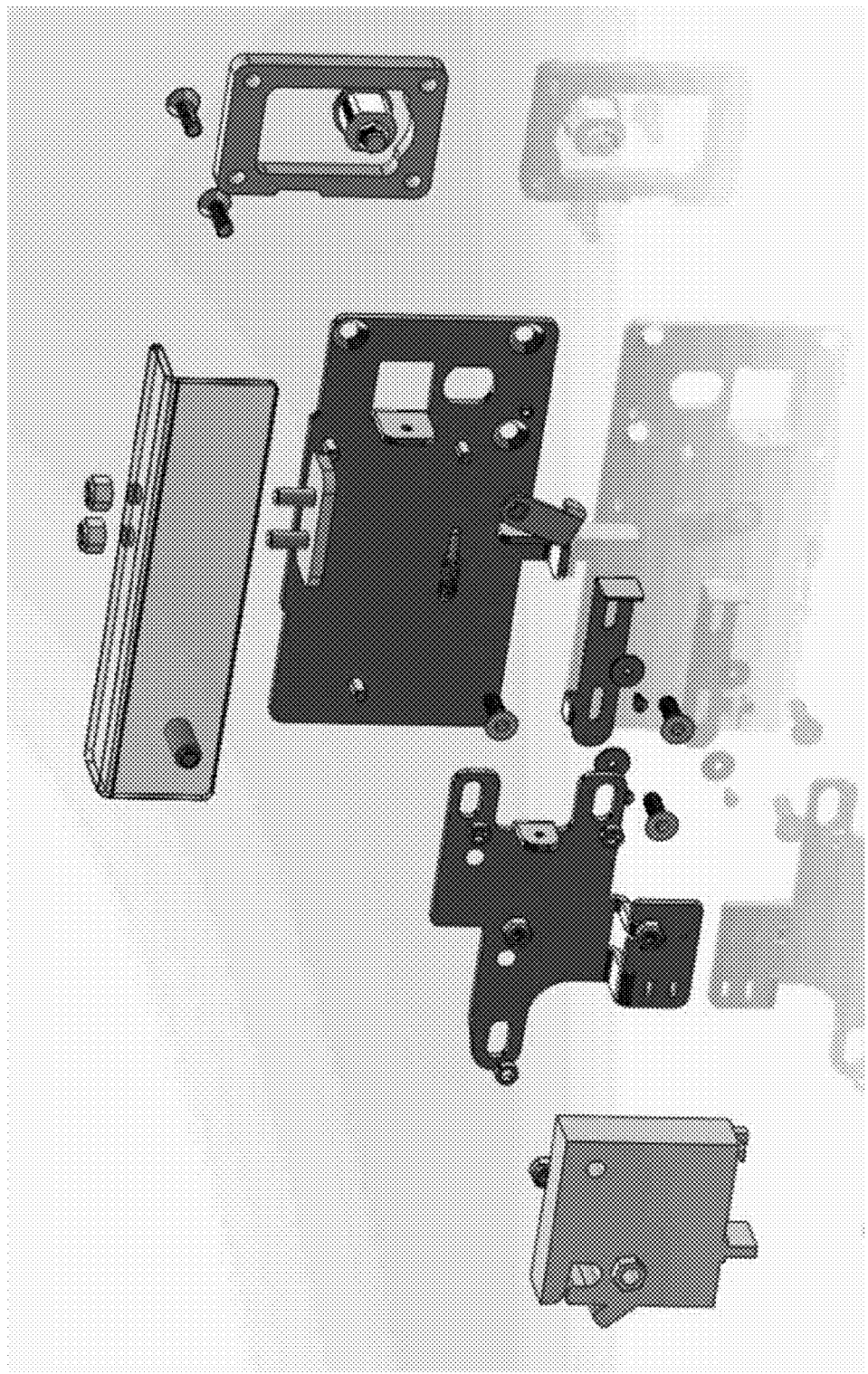
FIG. 4B is an exploded perspective view of a lock according to an embodiment of the invention.

FIGS. 4A-4B show a lock controlling mechanism for a lock 1036 which may be used in an ATM 10 according to an embodiment of the invention. The mechanism may control how the user manipulates the lock 1036 so that the open/close process is synchronized with the state of the ink staining system. The lock 1036 may be opened only when the staining system is disarmed. The lock 1036 may comprise a microswitch 410, which is shown in more detail in FIGS. 7A-7C. The microswitch 410 may be configured to detect a user accessing the lock. For example, when an authorized user starts turning the lock's handle (which may be accessible after the user has validated access via a key, code, or remotely in some embodiments), the handle may be configured to make a slight movement from its fully locked position, for example 10 degrees to the right or left. This slight movement may indicate to the AIMS 100 via a microswitch that the main lock 1036 mechanism is being opened, while not being enough to fully open the lock/door. Moving the handle away from its fully closed position may indicate that access is authorized so that deactivation of the ink staining system may begin. This mechanism may be utilized because in order to move the handle from its fully closed position, some form of clearance may be assumed (e.g., the user has gained access to the handle by inputting a valid code into the keypad 132).

The Driver X 110 may begin ink staining deactivation and then begin polling for deactivation confirmation from the ink staining system. Once deactivation is confirmed, the handle may be released from the intermediate position, and the user may now be able to turn the handle to a fully open position. This may allow the door to open and provide physical access to the vault with the certainty that ink staining system is disabled. For example, once deactivation has happened the driver X 110 may send a signal to the lock 1036 to allow the lock 1036 to be turned 90 degrees for door opening. When the user locks the ATM again, the Driver X 110 may reactivate the ink staining system automatically once it determines that the handle is no longer moving.

Figure 9:
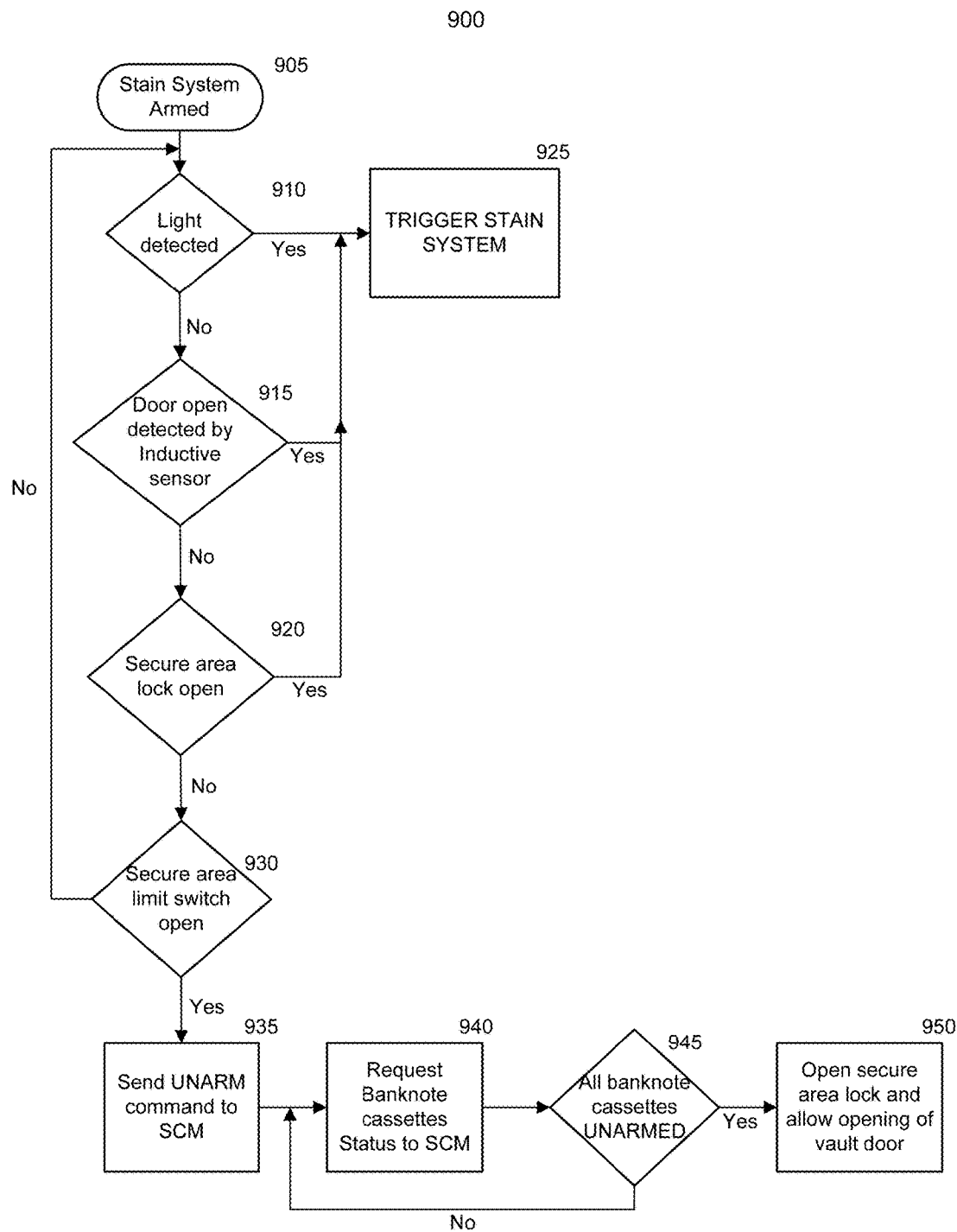
FIG. 9 is an ink staining system control process according to an embodiment of the invention.

FIG. 9 is an ink staining system control process 900 according to an embodiment of the invention. In 905, the ink staining system may be armed (e.g., as a default setting, the ink staining system may be armed during ATM 10 ordinary operation). In 910 a light sensor 126 may detect light indicating that a door to the secure area 12 of the ATM 10 has been opened, in 915 an inductive sensor may determine that a door to the secure area 12 has been opened, and/or in 920 a microswitch 410 may determine that a door to the secure area 12 has been opened. In any of these cases, the ink staining system may be triggered in 925. If no sensor detects an unexpected door opening, in 930 a secure area limit switch may be opened. In 935, an unarm command may be sent from driver X 110 to the SCM 144. In 940, driver X 110 may request status of the banknote cassettes from the SCM 144. If, in 945, all bank note cassettes are unarmed, the secure area lock 1036 may be opened by the driver X 110 to allow opening of the door.

Figure 7A:
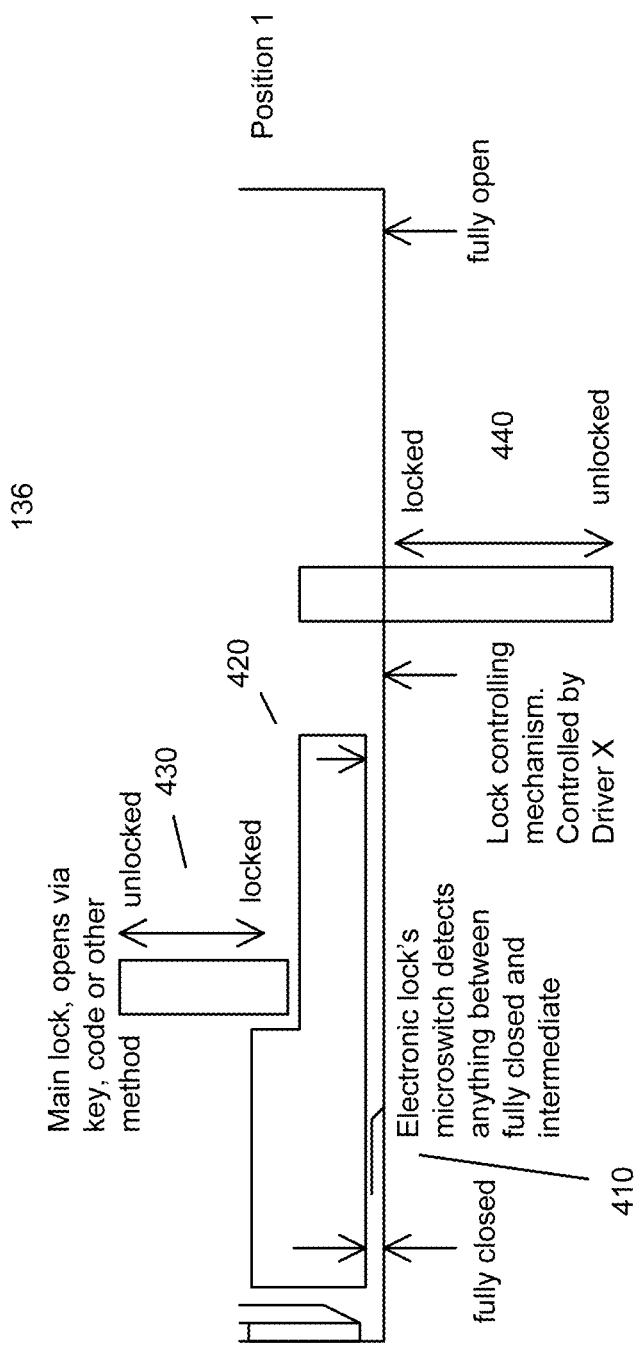
FIGS. 7A-7C show a lock operation according to an embodiment of the invention.
Figure 7B:
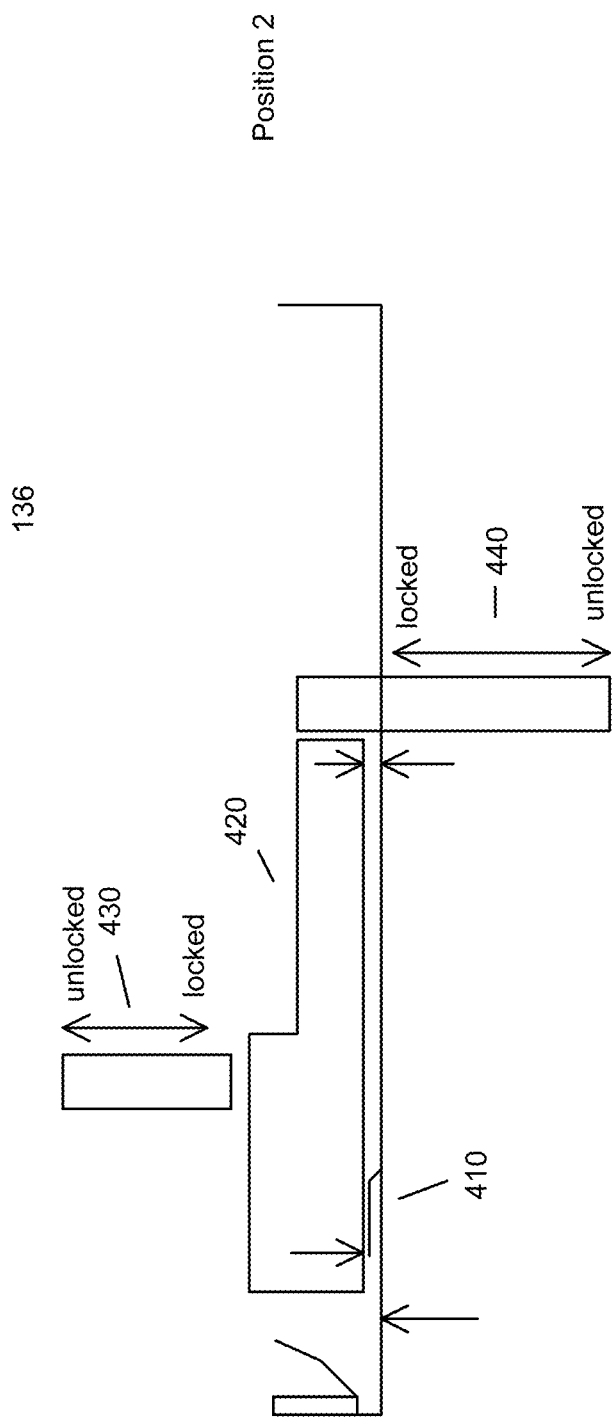
Figure 7C:
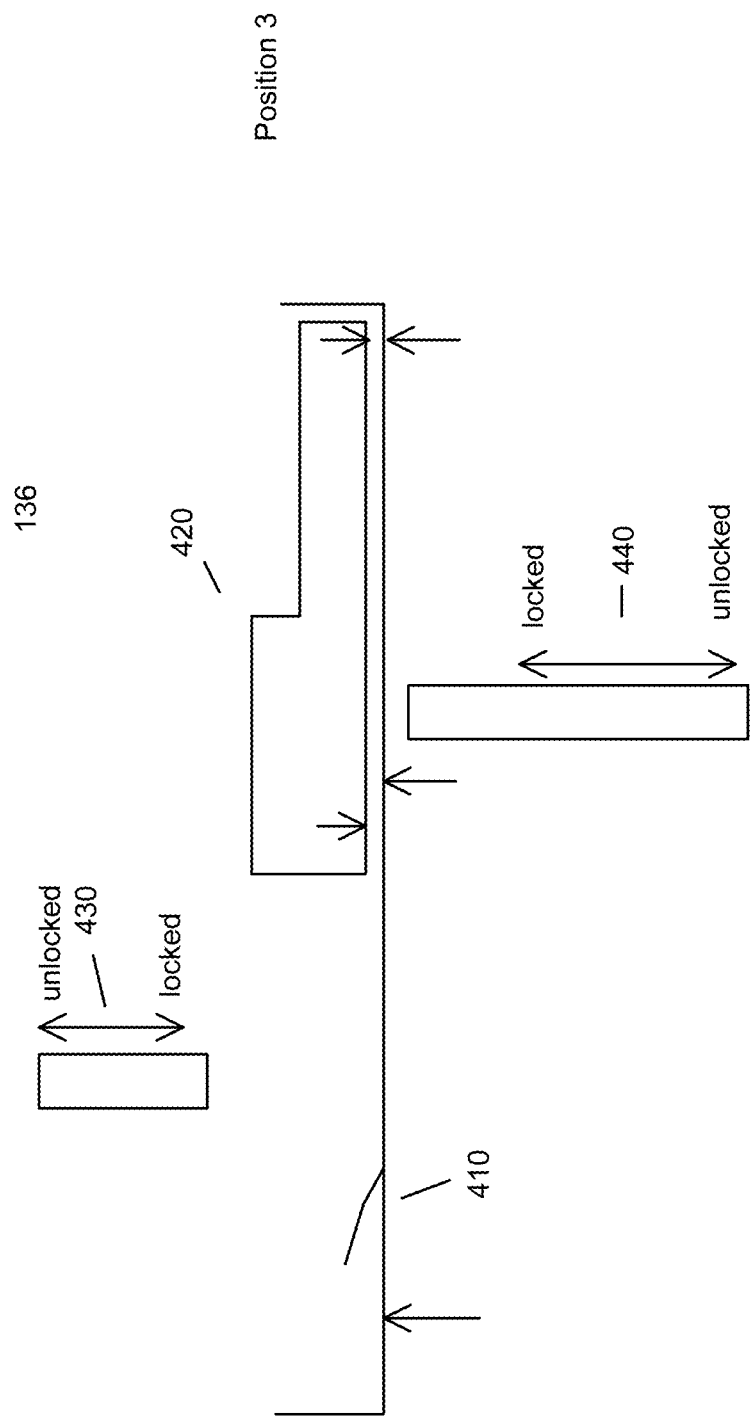

FIGS. 7A-7C show a lock operation for the lock 1036 according to an embodiment of the invention. The lock 1036 may include a fastener 420 which may be fully closed, partially closed, or open. In FIG. 7A, the lock 1036 is fully closed. In FIG. 7B, the main lock 420 may be opened (e.g., the user may start turning the lock's handle as described above), and thus the fastener 420 may be partially closed and blocked by the lock controlling mechanism 440. The microswitch 410 may detect the presence of the fastener 420 in the position of FIG. 7A or 7B. Specifically, the microswitch 410 may determine that the fastener 420 has moved between the positions of FIGS. 7A and 7B, indicating that an authorized user has begun opening the lock 1036. In response, driver X 110 may disable the ink staining system. When the ink staining system is disabled, driver X 110 may control the lock controlling mechanism 440 to move to the position of FIG. 7C, thereby allowing the fastener 420 to be moved to a fully open position.

Figure 5:
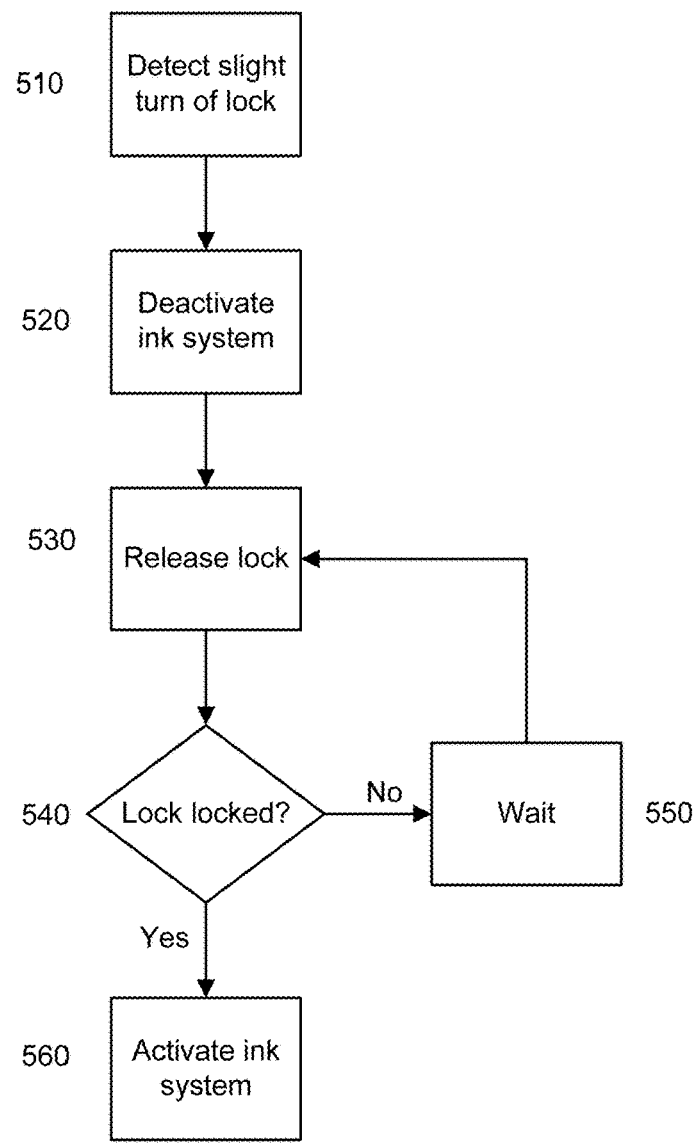
FIG. 5 is an ink staining system control process according to an embodiment of the invention.

FIG. 5 is an ink staining system control process 500 according to an embodiment of the invention. In 510, the driver X 110 may receive indication from the lock 1036 that a user has turned the lock 1036 slightly (e.g., the user has started to unlock the lock 136 using a key). For example, the user may be able to turn the lock 1036 ten degrees, at which point the lock 136 cannot be turned further without intervention from the driver X 110. In 520, the driver X 110 may deactivate the ink staining system. In 530, the driver X 110 may release the lock 1036 so that the user can continue turning the lock 1036 to an open position (e.g., 90 degrees). In 540, the driver X 110 may check whether the lock 1036 has been closed by the user. If not, in 550 the driver X 110 may wait for a predetermined interval and then check again. This may be repeated until the lock 1036 is locked. When the lock 1036 is locked, in 560 the driver X 110 may reactivate the ink system.

Figure 6:
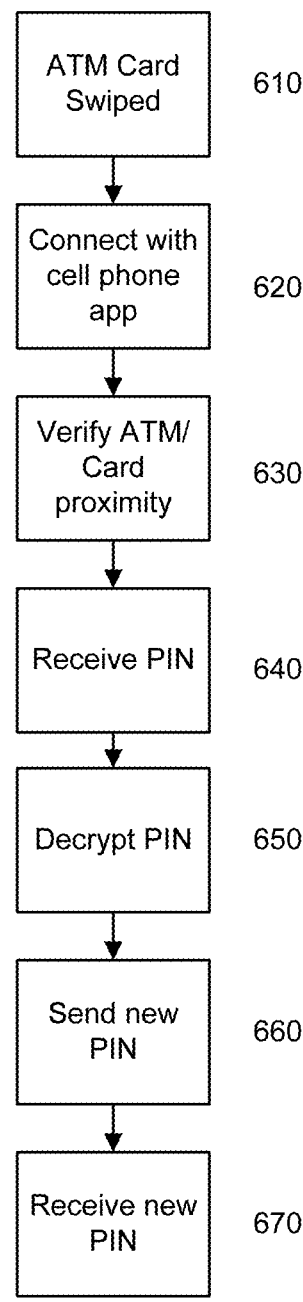
FIG. 6 is a verification process according to an embodiment of the invention.

The AIMS 100 may also include features to guard against ATM skimming. Skimming may be described as a type of fraud wherein thieves capture ATM card numbers using a counterfeit card reader and personal identification numbers (PINs) through various techniques such as hidden cameras or false keypads. Once the thieves have both the ATM card number and the PIN, they can make withdrawals or purchases from the associated bank account. FIG. 6 is a verification process 600 according to an embodiment of the invention which may be used to thwart skimming attempts.

An ATM 10 customer may install a banking app on a smartphone or other device which may be equipped with local wireless communication capability (e.g., Bluetooth) and general network communication capability (e.g., cellular, 3G, 4G, etc.). The example below illustrates use of the banking app or a smartphone, but any device with the banking app may also be used. The customer may carry their smartphone with the banking app and approach the ATM 10. In 610 the customer may swipe their ATM card, and this may be detected by the ATM 10. In 620 the AIMS 100 may connect with the smartphone via Bluetooth or some other wireless connection. The smartphone may detect the ATM, for example when the smartphone and ATM are in proximity to one another and the smartphone detects the ATM through the Bluetooth connection. The user may be prompted to connect with the ATM and may choose to do so. The smartphone may inform the AIMS 100 that the customer is actually at the ATM 10, for example via the Bluetooth connection. The AIMS 100 may communicate this information to the bank via an Ethernet connection or other connection. The bank may prompt the customer to enter the PIN via the banking app (e.g., via a cellular, 3G, or 4G connection). The customer may enter their PIN and send it using the banking app. In 640 the bank may receive the PIN from the customer via the banking app. In 650 the bank may decrypt the PIN and compare it to the stored PIN associated with the customer's account. If the numbers match, in 660 the bank may send a new PIN which may be randomly or pseudorandomly generated. The bank may send new PIN via, in some embodiments, a secure, encrypted connection to the banking app and the AIMS 100. The customer may enter this new PIN using the ATM 10 keypad. In 670 the AIMS 100 may receive the entered number and verify it against the number it received via the keypad. Then the customer may use the ATM 10 for banking transactions. Because the number entered into the ATM 10 is not the customer's actual PIN, a skimming attempt would capture the wrong PIN, and a would-be thief will be unable to access the customer's account.

In some embodiments, the ATM 10 may transmit the card swipe data and the data received from the smartphone in 620 to a client bank (e.g. via Ethernet), indicating to the client bank that the card is at the ATM 10. The client bank may directly send the new number to the smartphone, which may allow the verification to be performed even if an AIMS 100 is not present in the ATM 10.

Some examples of elements incorporated in embodiments of the invention follow:
*An example product/manufacturer of a secure lock:
Manufacturer: La GARD
Product: Programmable Multi-User, Multi-Compartment Safe Locks
E.g., http://www.kaba-mas.com/la-gard-brand/products/electronic/367332/smart-series.html

*An example product/manufacturer of a non-secure lock:
Manufacturer: SOUTHCO
Product: R4-EM-21-161
E.g., http://www.southco.com/es-es/r4-em/r4-em-21-161
*An example product/manufacturer of a sensor:
Manufacturer: OMRON
Product: E2A-S08KN04-WP-C1 2M
E.g., http://www.ia.omron.com/product/item/e2a_7229f/
*An example product/manufacturer of the alarm:
Manufacturer: MG electronics
Product: KPS3610—Piezo Buzzer
E.g.,
http://www.mgelectronics.com/shopdisplayproducts.asp?Search=Yes&sppp=10&page=1&Keyword=buzz&category=ALL&highprice=0&lowprice=0&allwords=buzz&exact=&atleast=&without=&cprice=

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An automated teller machine (ATM) security system comprising:
   an ink staining system;
   an electronic lock; and
   a processor in communication with the electronic lock and the ink staining system, the processor configured to:
      determine that the lock is being opened;
      disable the ink staining system in response to the determining; and
      enable the ink staining system when the lock has been closed;
   a sensor in communication with the electronic lock, the sensor configured to detect opening of a compartment of the ATM;
   wherein the sensor comprises a light sensor, an inductive sensor, a lock sensor, or a combination thereof;
   wherein the light sensor is configured to detect the opening of the compartment of the ATM based on a detection of a selectable light level.

2. The security system of claim 1, wherein the electronic lock comprises:
   a main lock;
   a microswitch configured to detect opening of the main lock, wherein the processor determines the lock is being opened based on the detection of the micro switch; and
   a lock controlling mechanism configured to prevent full opening of the lock until the ink staining system is disabled.

3. The security system of claim 1, wherein the ink staining system comprises a security control module and an in-cassette staining device.

4. The security system of claim 1, wherein the processor is further configured to enable the ink staining system in response to the detected opening of the compartment of the ATM.

5. The security system of claim 1, further comprising a teleruptor and/or power source in communication with the processor and a cash dispenser, wherein disabling the cash dispenser comprises directing the teleruptor and/or power source to cut off power to the cash dispenser without deactivating the ATM.

6. The security system of claim 1, wherein the processor is configured to determine whether the opening of the compartment is authorized.

7. The security system of claim 6, further comprising a keypad in communication with the processor, wherein the processor is configured to determine whether the opening of the compartment is authorized by determining whether a correct code has been entered into the keypad.

8. The security system of claim 1, wherein the processor is configured to report the opening of the compartment.

9. The security system of claim 1, wherein the ink staining system comprises a security control module and an in-cassette staining device.

10. The security system of claim 1, wherein the processor is further configured to:
    detect unusual dispensing activity in a monitored operation of a cash dispenser; and
    disable the cash dispenser when unusual dispensing activity is detected.

11. The security system of claim 1, wherein the processor is configured to report the unusual dispensing activity.

12. A security system for an automated teller machine (ATM) comprising a cash dispenser, the security system comprising:
    a sensor configured to detect opening of a compartment of the ATM; and
    a processor in communication with the sensor configured to disable the cash dispenser when the compartment is open;
    wherein the sensor comprises a light sensor, an inductive sensor, a lock sensor, or a combination thereof,
    wherein the light sensor is configured to detect the opening of the compartment of the ATM.

13. The security system of claim 12, wherein the processor is configured to determine whether the opening of the compartment is authorized.

14. The security system of claim 13, further comprising a keypad in communication with the processor, wherein the processor is configured to determine whether the opening of the compartment is authorized by determining whether a correct code has been entered into the keypad.

15. The security system of claim 12, wherein the processor is configured to report the opening of the compartment.

16. The security system of claim 15, wherein the processor is configured to report the opening of the compartment by activating an alarm, sending a message to a remote location, or a combination thereof.

17. The security system of claim 12, further comprising a teleruptor and/or power source in communication with the processor and the cash dispenser, wherein disabling the cash dispenser comprises directing the teleruptor and/or power source to cut off power to the cash dispenser without deactivating the ATM.

18. The security system of claim 12, further comprising an electronic lock comprising:
- a main lock;
- a microswitch configured to detect opening of the main lock, wherein the processor determines if the lock is being opened based on the detection of the micro switch; and a lock controlling mechanism configured to prevent full opening of the lock until the ink staining system is disabled.

19. The security system of claim 12, wherein the processor is further configured to:
- detect unusual dispensing activity in the monitored operation of the cash dispenser;
- disable the cash dispenser when unusual dispensing activity is detected;
- report the unusual dispensing activity; or any combination thereof.

* * * * *